(12) United States Patent
Nagaraj et al.

(10) Patent No.: US 7,437,719 B2
(45) Date of Patent: Oct. 14, 2008

(54) COMBINATIONAL APPROACH FOR DEVELOPING BUILDING BLOCKS OF DSP COMPILER

(75) Inventors: Ashik Kumar Shivacharya Nagaraj, Karnataka (IN); Thyagarajan Venkatesan, Karnataka (IN); Ravindra Shetty Kayandoor, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 10/675,910

(22) Filed: Sep. 30, 2003

(65) Prior Publication Data

US 2005/0071825 A1    Mar. 31, 2005

(51) Int. Cl.
  *G06F 9/45*   (2006.01)
  *G06F 7/38*   (2006.01)
(52) U.S. Cl. ............... 717/136; 712/35; 712/241
(58) Field of Classification Search ......... 717/136–161; 712/35, 241
  See application file for complete search history.

(56) References Cited

U.S. PATENT DOCUMENTS

| | | | |
|---|---|---|---|
| 4,989,145 A | | 1/1991 | Kyushima |
| 6,367,071 B1 * | | 4/2002 | Cao et al. ............... 717/160 |
| 6,467,082 B1 * | | 10/2002 | D'Arcy et al. ............ 717/127 |
| 6,598,221 B1 * | | 7/2003 | Pegatoquet et al. ........ 717/152 |
| 6,643,630 B1 * | | 11/2003 | Pegatoquet et al. ......... 706/45 |
| 2005/0107999 A1 * | | 5/2005 | Kempe et al. ............. 704/9 |

OTHER PUBLICATIONS

Grantson, Lexical Functional Grammar: Analysis and Implementation, www.Google.com, May 16, 2002, pp. 1-15.*
Online document from http://en.wikipedia.org/w/index.php?title=Lexical_functional_grammar&printable=yes, fetched on Nov. 21, 2006, pp. 1-2.*
Powell et al., Direct synthesis of optimized DSP assembly code from signal flow block diagrams, IEEE, Mar. 1992 pp. 553-556 vol. 5.*
van Engelen et al., An efficient algorithm for pointer-to-array access conversion for compiling and optimizing DSP applications, IEEE, 2001 pp. 80-89.*
Karttunen et al., Twenty-Five Years of Finite-State Morphology, IEEE, 2003, pp. 71-83.*
"AC/DC Project", http:web.archive.org/web/20030814011852/www.daimi.au.dk/CPnets/ACDC/, (archived Aug. 14, 2003), 2 pgs.
"HP Labs 2001 Technical Reports Abstracts", http://web.archive.org/web/20021214001120/http://www.hpl.hp.com/techreports/ 2001/, (archived Dec. 14, 2002), 9 pgs.

(Continued)

*Primary Examiner*—Wei Y. Zhen
*Assistant Examiner*—Satish S Rampuria
(74) *Attorney, Agent, or Firm*—Schwegman, Lundberg & Woessner, P.A.

(57) ABSTRACT

An approach that uses a combinatorial approach by adopting natural language processing with the application of Finite State Morphology (FSM) to transform source code into an efficient assembly code. In one example embodiment, this is accomplished by modifying a source code, including multiple instructions, using Lexical Functional Grammar Analysis (LFGA) operation on each instruction as a function of specific Digital Signal Processor architecture. The structure of the modified source code is then changed through multiple iterations using Finite State Morpohology (FSM) and Dynamic Instruction Replacement (DIR) to generate the efficient source code.

3 Claims, 7 Drawing Sheets

OTHER PUBLICATIONS

"Xerox Finite-State Compiler", http://web.archive.org/web/20020202050301/ http://www.xrce.xerox.com/research/mltt/fst, (archived Feb. 2, 2002), 1 pg.

Lorenz, M., et al., "Energy Aware Compilation for DSPs with SIMD Instructions", *LCTES '02—Scopes '02*, (2002), 8 pgs.

Lorenz, M., et al., "Low-Energy DSP Code Generation Using a Genetic Algorithm", *Proceedings of the International Conference on Computer Design: VLSI in Computers & Processors (ICCD '01)*, (2001), 7 pgs.

Lorenz, M., et al., "Optimized Address Assignment for DSPs With SIMD Memory Accesses", *Proceedings of the 2001 Conference on Asia South Pacific Design Automation*, (2001), 415-420.

Weiss, M. H., et al., "Toolumgebung fur plattformbasierte DSPs der nachsten Generation", *Conference Proceedings, DSP Deutschland*, (1999), 10 pgs.

* cited by examiner

COMBINATIONAL APPROACH FOR DEVELOPING BUILDING BLOCKS OF DSP COMPILER

TECHNICAL FIELD OF THE INVENTION

The inventive subject matter described herein relates generally to compilers for computers, and more particularly to Digital Signal Processors (DSPs).

BACKGROUND OF THE INVENTION

Optimizing compilers are software systems for translation of programs from higher level languages into equivalent assembly code, also referred to as assembly code, for execution on a computer. Optimization generally requires finding computationally efficient translations that reduce program runtime. Such optimizations may include improved loop handling, dead code elimination, software-pipelining, improved register allocation, instruction prefetching, instruction scheduling, and/or reduction in communication cost associated with bringing data to the processor from memory. In addition, optimization requires compilers to perform such tasks as content and contextual analysis, fact-finding, translation, and so on to provide an efficient assembly code.

Current DSP (Digital Signal Processor) compilers do not generate efficient assembly code because current approachs do not exploit the intrinsic characteristics of a DSP, such as Multiply ACcumulate (MAC) units, special purpose registers, multiple buses with restricted connectivity, number of pipeline stages, and so on. Even an experienced assembly programmer generates optimized assembly code for a given application, after a few iterations, manually by incorporating a myriad of permutations and combinations of intrinsic characteristic of the DSP functionalities. This manual approach takes a longer period of time and the window of opportunity to reach the market (time to market) with an efficient DSP compiler can be significantly affected. Generally, DSPs are dedicated processors that are used in real time applications, such as in wireless communications that require optimized assembly code to process information most efficiently in a manner so that it consumes less power, enhances speed, and increases channel capacity.

Accordingly, there is a need for a DSP compiler that captures architecture specific functionalities to efficiently generate assembly code. There is also a need for a DSP compiler that can efficiently map higher level programming language to assembly code of the target DSP. Furthermore, there is a need for rapid development of compiler to handle the complexities of modern DSPs.

DETAILED DESCRIPTION OF THE INVENTION

An embodiment of the inventive subject matter described herein provides an approach for generating efficient assembly code for DSP (Digital Signal Processor) by exploiting intrinsic characteristics of a DSP, such as Multiply ACcumulate (MAC) units, special purpose registers, multiple buses with restricted connectivity, number of pipeline stages, and so on. The approach, implemented in a variety of example embodiments described herein, uses a combinatorial approach by adopting natural language processing with the application of Finite State Morphology (FSM) to obtain an efficient assembly code.

According to one example embodiment, the approach or technique provides basic building blocks or framework for compiler development to support non-standard Digital Signal Processor (DSP) architecture with heterogeneous register, memory, MAC units, pipeline structures that are found in modern DSPs. It also supports complex instruction set and algorithmic transformations required for generating optimal assembly code using LFGA (Lexical Functional Grammar Analysis) and FSM engines. The approach also explores register allocation, instruction scheduling, instruction selection, and permutation through Petri Nets and Genetic algorithms. In addition, according to other example embodiments, the approach also provides a methodology for capturing architecture specific optimization through DIR (Dynamic Instruction Replacement). Furthermore, the approach allows a developer to efficiently map a higher language description, such as C language descriptions in a signal processing algorithm/program to assembly instructions. According to still other example embodiments, the approach further provides building blocks to support rapid development of a compiler for modern DSPs.

In the following detailed description of the embodiments of the subject matter, reference is made to the accompanying drawings that form a part hereof, and in which are shown, by way of illustration, specific embodiments in which the subject matter may be practiced. These embodiments are described in sufficient detail to enable those skilled in the art to practice the subject matter, and it is to be understood that other embodiments may be utilized, and that changes may be made without departing from the scope of the inventive subject matter described herein. The following detailed description is, therefore, not to be taken in a limiting sense, and the scope of the inventive subject matter described herein is defined only by the appended claims.

The terms "higher language", "higher level language", "higher level programming language", and "source code" are used interchangeably throughout the document. In addition, the terms "assembly code" and "source code" are used interchangeably through the document.

Figure 1:
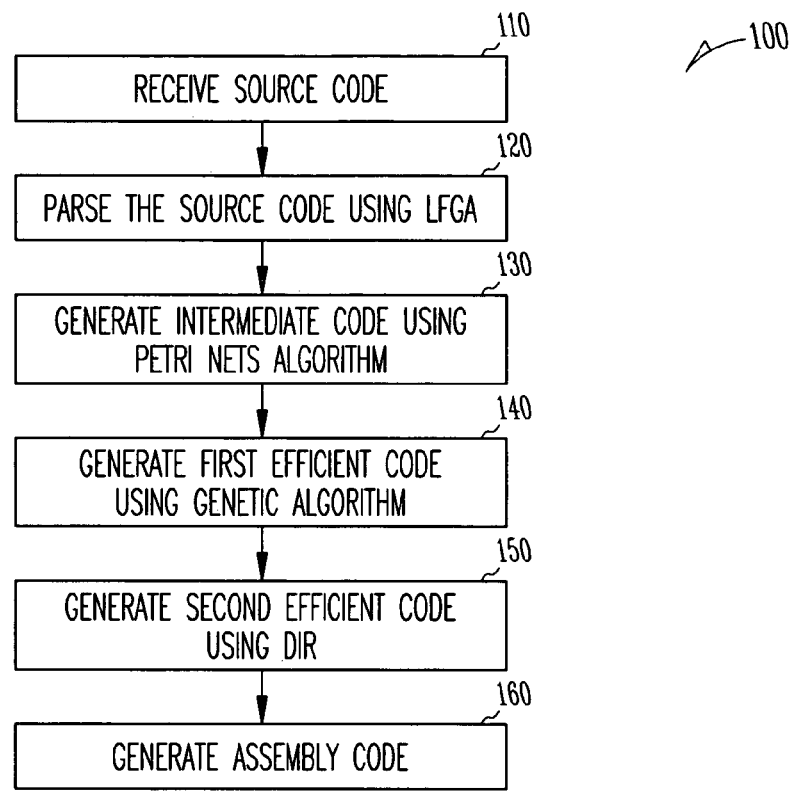
FIG. 1 is a flowchart illustrating a method of generating assembly code for a DSP (Digital Signal Processor), in accordance with one embodiment of the inventive subject matter described herein.

FIG. 1 illustrates a first example embodiment of a method 100 according to the inventive subject matter described herein. In this example embodiment, the objective is to transform source code of a DSP into an efficient assembly code for processing on a DSP.

At 110, source code in the form a higher level language, such as a C program, is received. At 120, the above received source code is parsed using Lexical Functional Grammar Analysis (LFGA) to modify the source code to suit a target DSP architecture. In some embodiments, source code, including multiple instructions, is modified by performing the LFGA operation on each instruction as a function of a specific DSP architecture. The following illustrates one example modification of source code that includes a loop size of 39, using the LFGA operation:

```
For (j=0; j<39; j++)
{
Scratch[j] = Mult(Scratch[j], 11;}
```

If the MAC size of a specific DSP architecture is n, then the above loop size of 39 must be a multiple of n. For example, in an Intel® IXS1000 media signal processor the MAC size is 4 and the above loop size is not a multiple of 4. Therefore, in this case the loop size is increased, by increasing the buffer size and the loop size, by adding a dummy instruction to make the loop size a multiple of 4. The modified source code will be as follows:

```
For (j=0; j<40; j++)
{
Scratch[j] = Mult(Scratch[j], 11);}
```

During operation, the above dummy instruction remains in the source code and when accessing data only the first 39 values will be accessed. Adding the dummy instruction in the above example results in a reduced memory usage and a gain in number of cycles required to carry out the same computation, thereby generating an efficient source code.

Figure 2:
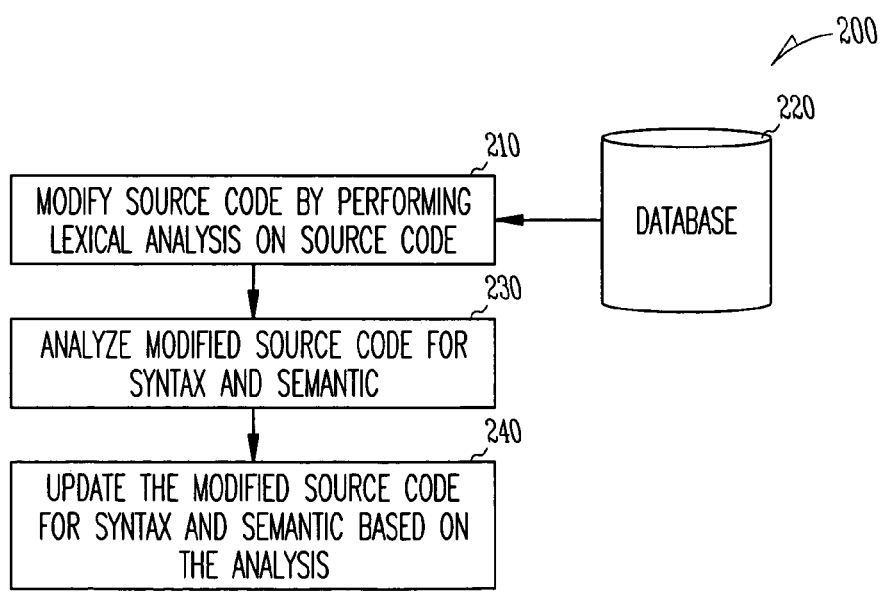
FIG. 2 is a flowchart illustrating a method of generating modified source code using LFGA (Lexical Functional Grammar Analysis), in accordance with one embodiment of the inventive subject matter described herein.

Referring now to FIG. 2, there is illustrated an example method 200 of performing an LFGA operation on each instruction in the source code. At 210, Lexical analysis is performed on each instruction in the source code based on a target DSP architecture stored in database 220. The database 220 can include DSP resource information such as, registers, pipeline structures, instruction scheduling, memory, MAC units, and so on. At 230 and 240, the modified source code is further analyzed for syntax and semantics, respectively, and the source code is further modified and/or updated based on the outcome of the syntax and semantic analysis.

Figure 3:
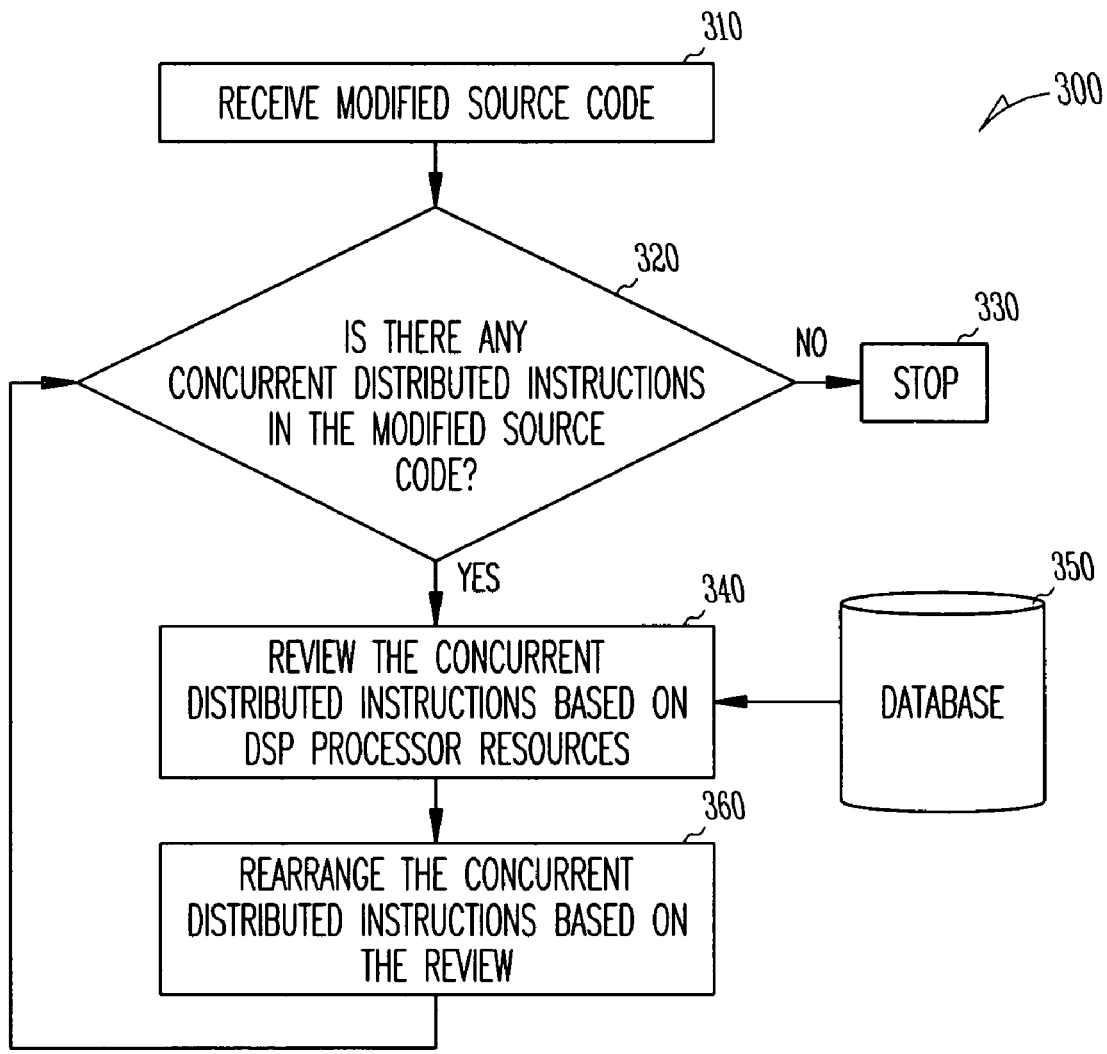
FIG. 3 is a flowchart illustrating a method of generating rearranged blocks of instructions, in the modified source code shown in FIG. 2, in accordance with one embodiment of the inventive subject matter described herein.

Referring now to FIG. 1, at 130, intermediate code is generated using the above modified source code. In one example embodiment, the intermediate code is generated by using the Petri Nets algorithm. Petri Nets is a mathematical tool that can be used to analyze flow of instructions in source code and to assign a flow pattern that is most efficient based on execution resources of target DSP architecture. Petri Nets can account for all DSP resource issues and can provide an efficient flow pattern for the source code. Petri Nets is a tool that yields an efficient code when there are multiple independent execution resources, such as resource allocation, pipeline structures, instruction scheduling, memory, ALUs (Arithmetic Logic Units), MAC units to be considered, that are specific to a target DSP, in forming the source code. Petri Nets is especially useful in streamlining a flow pattern in a source code that includes concurrent distributed instructions. Petri Nets tool can be used as follows:

PN=(P, T, I, O, M); where
PN=Petri Net
P={p1, p2, p3, . . . , pm} is a finite set of places
T={t1, t2, t3, . . . , tn} is a finite set of transitions
I=Input function
O=Output function
M=Initial marking Referring Now to FIG. 3, there is illustrated an example method 300 for rearranging concurrent distributed instructions in the modified source code using Petri Nets algorithm. At 310, the above modified source code is received. At 320, the received modified source code is checked for concurrent distributed instructions. If there are no concurrent distributed instructions in the modified source code, the process stops at 330. If there are any concurrent distributed instructions in the modified source code, the concurrent distributed instructions are reviewed at 340 based on the execution resources, specific to a DSP architecture, stored in the database 350. At 360, the concurrent distributed instructions are rearranged to provide a most efficient flow pattern based on the stored execution resources. The above process repeats itself for each concurrent distributed instruction found in the modified source code until all of the concurrent distributed instructions in the modified source code are rearranged and the process stops at 330 to form the intermediate code.

Figure 4:
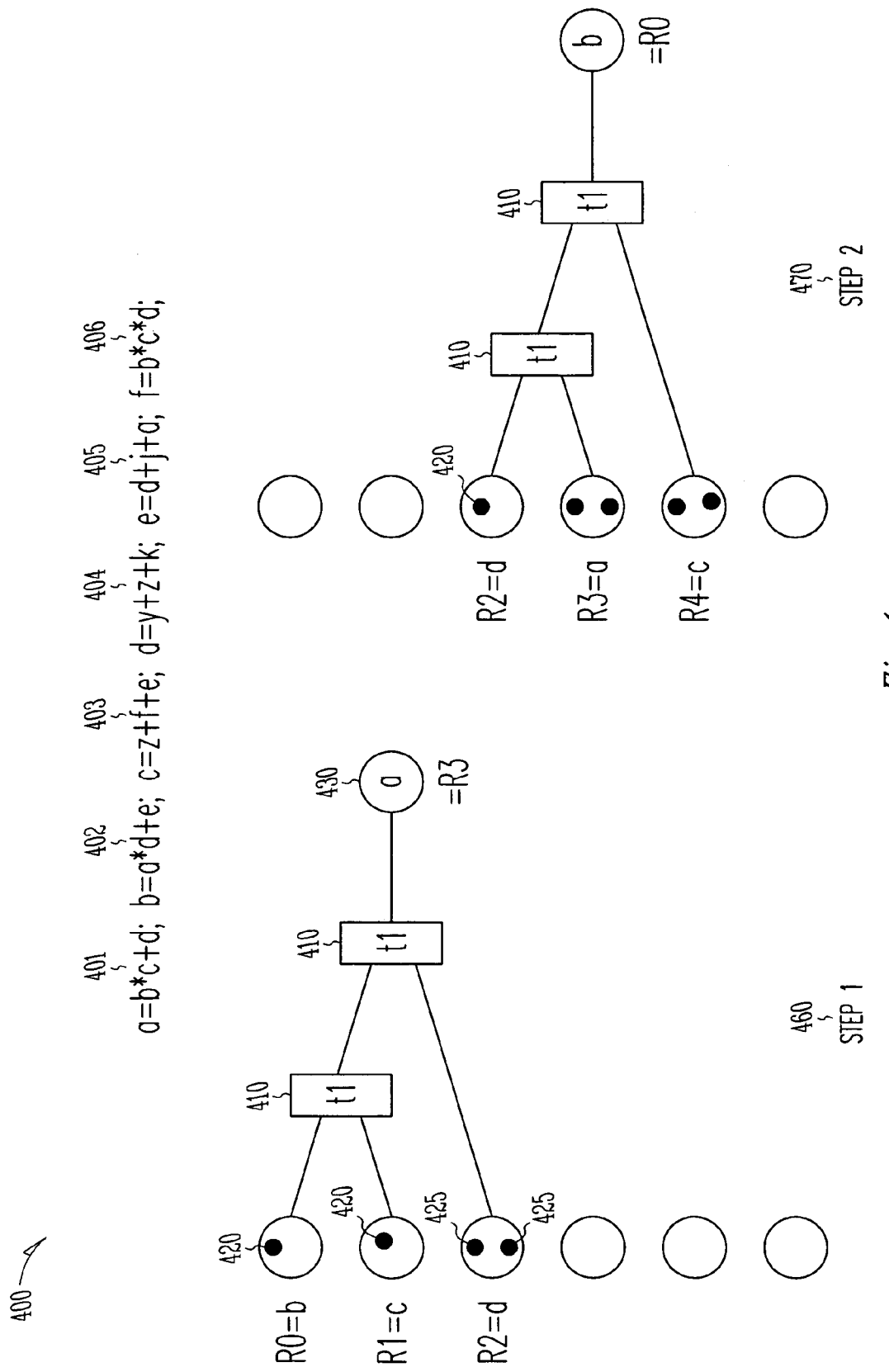
FIG. 4 is a block diagram illustrating using Petri Nets algorithm for a series of example multiplications that requires concurrent distributed instructions in the modified source code in accordance with one embodiment of the inventive subject matter described herein.

Referring now to FIG. 4, there is illustrated an example block diagram 400 that uses Petri Nets algorithm to a set of equations 401-406 that requires concurrent distributed instructions to execute the source code. Operations 1 and 2 shown in FIG. 4 depict applying Petri Nets to equations 401 and 402, respectively. The parameters t1, t2, and so on 410 are the transitions and they indicate execution of the multiplications and additions, respectively. A single black dot 420 in a circle indicates availability of resources. To execute the first equation 401, all of the three parameters b, c, and d are needed. Input parameters b, c, and d are stored in registers $R_0$, $R_1$, and $R_2$, respectively. In the example embodiment shown in FIG. 4, parameter a is the output of the first equation 401 that is in register $R_3$ and this is one of the input parameters for b in operation 2 470. Therefore, equation 402 cannot be executed until parameter a is available. This is a condition that needs to be satisfied when forming the source code. If the instructions are independent, they can be executed in parallel but in this case there is a dependency and therefore the instructions cannot be executed parallely. Two block dots in a circle 425 indicate the necessity of two parameters b and c to complete the execution of the equations 401 at 430. In the example shown in operation 1 460, parameters b and c are needed to execute parameter d. At any moment, memory used during execution of the equations 401 and 402 are known in operations 1 and 2.

It can be seen in FIG. 4 that the multiplication takes more cycles to execute than adding because parameters b and c have to be multiplied first and then added to d to execute the first equation 401. In the example shown in FIG. 4, multiplication of parameters b and c requires 2 cycles, and an additional one cycle of latency to wait for the result of the multiplication to be available at 430 before adding the result of the multiplication to parameter d. Such pipeline issues can be addressed using the Petri Nets algorithm. It can be seen from the above example that the Petri Nets addresses execution resource issues such as register allocation, pipeline issues, and so on in the source code. It can also be seen that by using Petri Nets algorithm at any given time which registers are being used and which are available for storing is known. FIG. 4 further illustrates using Petri Nets algorithm to execute equation 402 in operation 2 470. Similar process is used to execute equations 403-406.

Referring now to FIG. 1, at operation 140, a first efficient code is generated using Genetic algorithm. Genetic algorithms can solve complex optimization problems by imitating the natural evolution process. Generally, population of a Genetic algorithm can consist of several individuals, representation of individuals given by a chromosome which are then subdivided into genes. Genes are used to encode variables in an optimization problem. By applying genetic operators such as selection, mutation, crossover, and so on the best individual in a population can be selected in just a few iterations.

Figure 5:
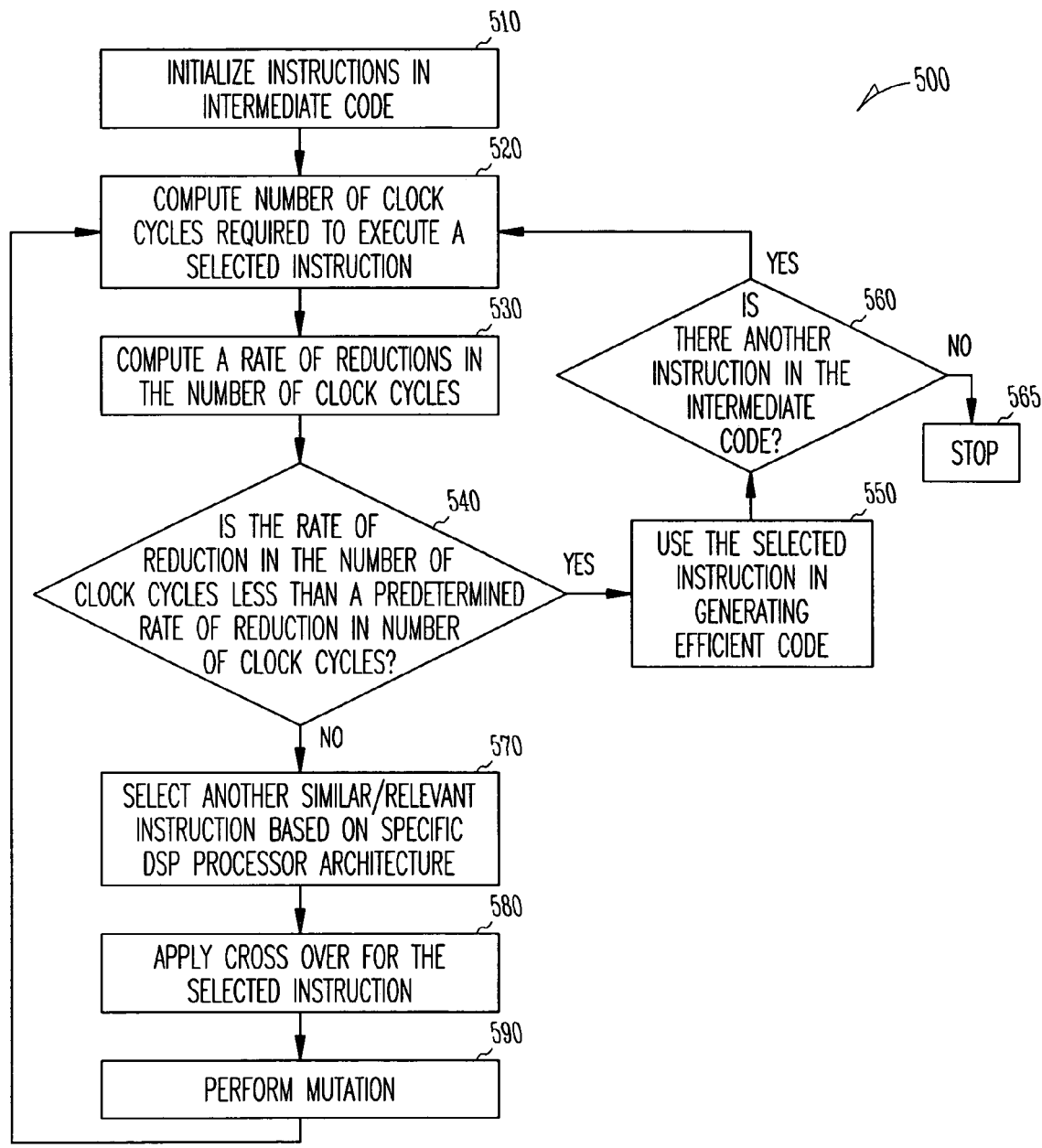
FIG. 5 is a flowchart illustrating a method of generating an efficient code using the modified source code, including the rearranged blocks of instructions shown in FIG. 3, in accordance with one embodiment of the inventive subject matter described herein.

Referring now to FIG. 5, there is illustrated an example method 500 of using a Genetic algorithm to generate the efficient source code. At 510, the above intermediate code is initialized. At 520, an instruction to be optimized is selected from the intermediate code and the number of clock cycles required to execute the selected instruction is computed. At 530, reduction in the number of clock cycles is computed. At 540, the computed reduction in the number of clock cycles is checked to see whether it is less than a predetermined reduction in number of clock cycles.

If the computed reduction in the number of clock cycles is not less than the predetermined reduction in number of clock cycles, another similar and/or relevant instruction based on a specific DSP architecture is selected. At 580, a cross over is applied for the selected instruction. At 590, the selected instruction is mutated and the above process is repeated.

If the computed reduction in the number of clock cycles is less than the predetermined reduction in number of clock cycles, the selected instruction is used in generating the first efficient code at 550. At 560, the intermediate code is again checked to see if there are any other instructions that need to be optimized using the Genetic algorithm. If there is an instruction that needs to be optimized in the intermediate code, the process goes to 520 and repeats the above described process. If there are no other instructions that need to be optimized in the intermediate code, the process stops at 565.

The following example further illustrates the use of Genetic algorithm to find a global optimum:

Consider an instruction that requires a multiplication, such as a=b*c in the intermediate code. Assuming c is equal to 2, the above multiplication can be performed using following three methods:

$$a=b*2 \quad \text{(i)}$$

$$a=b<<1 \quad \text{(ii)}$$

$$a=b+b \quad \text{(iii)}$$

The following table illustrates the number of resources and number of cycles required to execute the source code for each of the above three methods.

| Methods | Resources | Cycles |
|---|---|---|
| a = b * 2 | 2 registers | 2 cycles |
| a = b << 1 | 2 registers | 2 cycles |
| a = b + b | 1 registers | 1 cycle |

It can be seen from the above table that the first and second methods requires 2 registers and 2 cycles to execute the instructions in the source code, i.e., loading data into the 2 registers take 1 cycle and an additional 1 cycle to execute. Whereas the third method requires the least number of cycles to execute the instructions in the source code, and therefore would be the preferred method. Instructions, such as the above computations and other such instructions can be processed using the Genetic Algorithm described above, with reference to FIG. 5, to select an optimum instruction that uses the least amount of processor resources.

Figure 6:
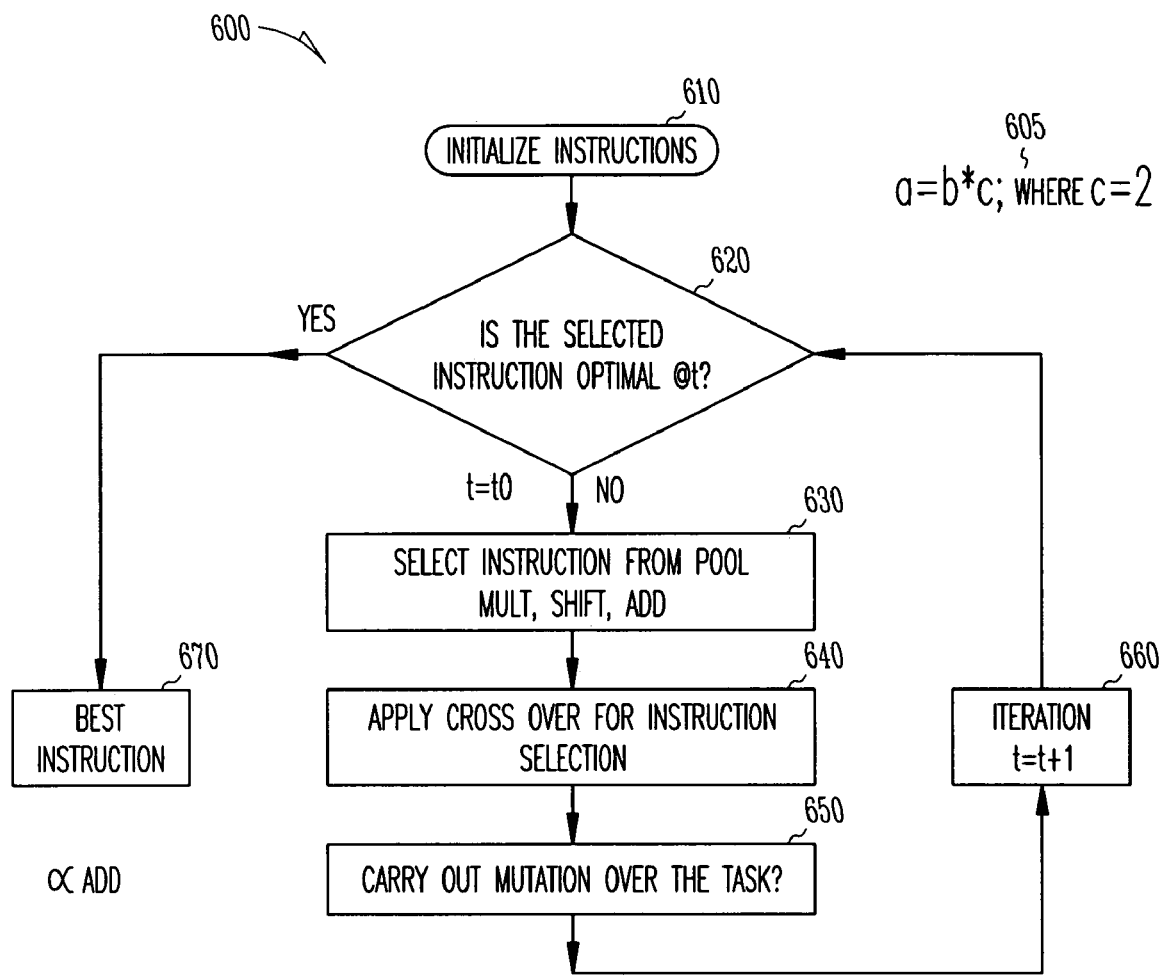
FIG. 6 is a flowchart illustrating a method of finding an optimum instruction using the Genetic algorithm in accordance with one embodiment of the inventive subject matter described herein.

Referring now to FIG. 6, there is illustrated the selection of the optimum instruction, for the example equation 605, using the Genetic algorithm as described above. At 610, the intermediate code is initialized. At 620, selected instruction is checked to see whether it is optimum based on a predetermined resource and number of cycles required to execute the instruction. If the selected instruction meets the above criteria then the process stops at 670. If the selected instruction does not meet the above criteria then a different method is selected to execute the equation at 630. At 640, a cross over is applied on the selected method. At 650 a mutation is performed on the selected method and the process is repeated 660 as shown in the FIG. 6 until an optimum instruction, which is adding as shown in the above table for the example equation 605, is selected.

Referring now to FIG. 1, at 150 a second efficient code is generated by performing Dynamic Instruction Replacement (DIR) on one or more selected instructions in the first efficient code. For example, in a processor such as an Intel® IXS1000 media signal processor, the shift operation during execution is carried out in RISC resources, which uses the least amount of processor resources such as number of cycles required to execute the source code. Some of the above executions can be done in DSP in an indirect manner by multiplying with a predefined number. At 160, assembly code is generated by mapping the second efficient code to the assembly code.

Although the flowcharts 100, 200, 300, 500, and 600 include acts that are arranged serially in the exemplary embodiments, other embodiments of the subject matter may execute two or more acts in parallel, using multiple processors or a single processor organized as two or more virtual machines or sub-processors. Moreover, still other embodiments may implement the acts as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 7:
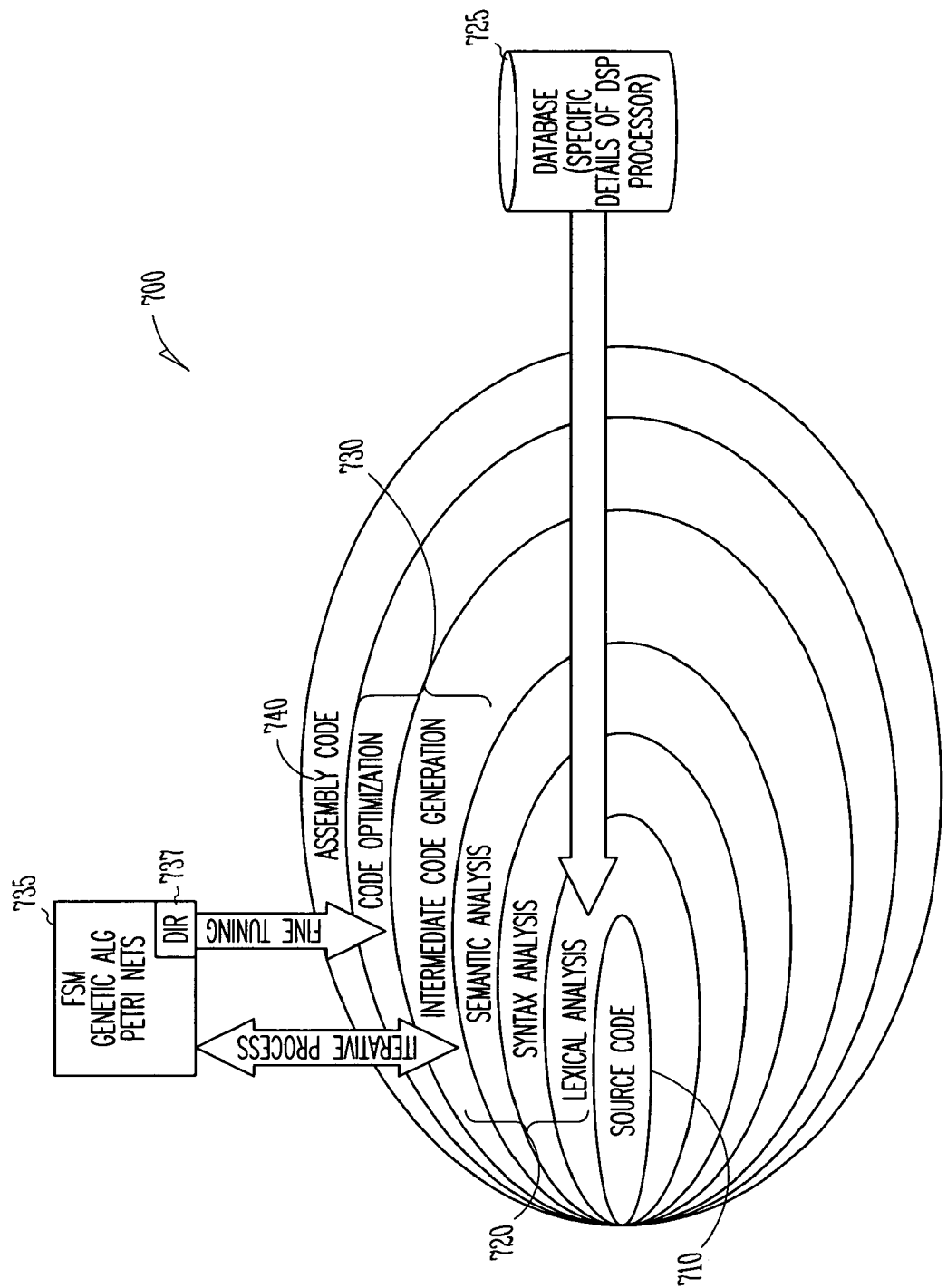
FIG. 7 is a block diagram of a DSP compiler, in accordance with one embodiment of the inventive subject matter described herein.

Referring now to FIG. 7, there is illustrated an example embodiment of a compiler 700 according to the inventive subject matter described herein. The compiler 700 includes an input module 710, an LFGA module 720, an FSM module 730, and an output module 740. As shown in FIG. 7, the LFGA module is coupled to database 725. Further, FIG. 7 shows algorithm module 735 that includes Genetic and Petri Nets. Furthermore, the algorithm module 735 includes a DIR module 737 which includes DIR algorithms. The algorithm modules 735 and 737 can be accessed by the FSM module during generation of intermediate code and first and second efficient codes.

In operation, input module 710 receives source code including multiple instructions. The LFGA module 720 then performs the LFGA operation on each instruction in the source code as a function of a specific DSP architecture. The LFGA operation includes parsing the source code by performing lexical analysis on each instruction in the source code. In some embodiments, the LFGA operation also includes analyzing the parsed source code for syntax and semantic and updating and/or modifying the source code. The performance of the LFGA operation on each instruction in the source code is explained in more detail with reference to FIGS. 1 and 2.

The FSM module 730 then generates intermediate code by allocating DSP resources to each instruction using the Petri Nets algorithm. The Petri Nets algorithm is stored in the algorithm module 735. The generation of the intermediate code by using the Petri Nets algorithm is explained in more detail with reference to FIGS. 3 and 4. The DSP resources allocated to each instruction using the Petri Nets algorithm can include resources, such as registers, pipeline structures, instruction scheduling, memory, ALUs, and MAC units. The DSP resources of a target DSP architecture are stored in the database 725.

The FSM module 730 further generates a first efficient code by selecting and comparing each instruction in the intermediate to one or more other similar available instructions using Genetic algorithm. The generation of the first efficient code by using the Genetic algorithm is further explained in more detail with reference to FIG. 5.

The FSM module 730 then selects one or more instructions from the multiple instructions that have similar available instruction sets in the first efficient code. The FSM module 730 then performs DIR on the one or more selected instruction to further generate a second efficient code. Again, the generation of the second efficient code using the DIR is explained in more detail with reference to FIG. 5. The output module 740 generates assembly code by mapping the second efficient code to the assembly code.

Figure 8:
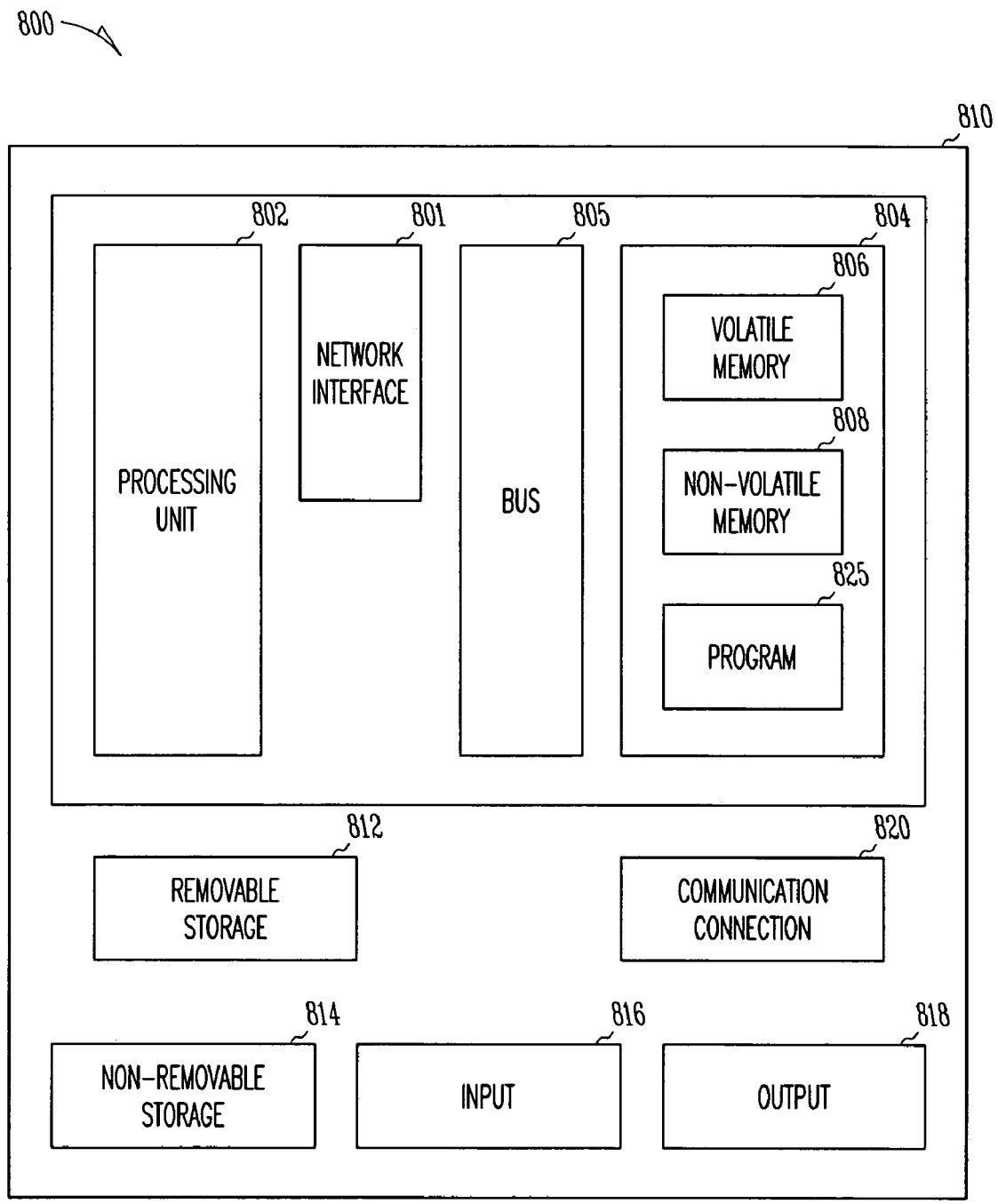
FIG. 8 is an example of a suitable computing environment for implementing embodiments of the inventive subject matter described herein.

FIG. 8 shows a block diagram 800 of an example of a suitable computing system environment for implementing embodiments of the inventive subject matter described herein. FIG. 8 and the following discussion are intended to provide a brief, general description of a suitable computing environment in which certain embodiments of the inventive concepts contained herein may be implemented.

A general computing device, in the form of a computer 810, may include a processing unit 802, memory 804, removable storage 812, and non-removable storage 814. Computer 810 additionally includes a bus 805 and a network interface (NI) 801.

Computer 810 may include or have access to a computing environment that includes one or more input elements 816, one or more output elements 818, and one or more communication connections 820. The computer 810 may operate in a networked environment using the communication connection 820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 804 may include volatile memory 806 and non-volatile memory 808. A variety of computer-readable media may be stored in and accessed from the memory elements of computer 810, such as volatile memory 806 and non-volatile memory 808, removable storage 812 and non-removable storage 814.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM); hard drive; removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit" or "computer" or "DSP", as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, Explicitly Parallel Instruction Computing (EPIC) microprocessor, a graphics processor, a digital signal processor, or any other type of processor or processing circuit. The term also includes embedded controllers, such as Generic or Programmable Logic Devices or Arrays, Application Specific Integrated Circuits, single-chip computers, smart cards, and the like.

Embodiments of the subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 802 of the computer 810. For example, a computer program 825 may comprise machine-readable instructions capable of translating source code into assembly code according to the teachings of the inventive subject matter described herein. In one embodiment, the computer program 825 may be included on a CD-ROM and loaded from the CD-ROM to a hard drive in non-volatile memory 808. The machine-readable instructions cause the computer 810 to transform a program in a higher level language into efficient assembly code according to the teachings of the inventive subject matter described herein.

The various embodiments of the DSP compilers and methods of translation of source code into assembly code described herein are applicable generically to any computationally efficient translations that reduce program runtime, and the embodiments described herein are in no way meant to limit the applicability of the subject matter. In addition, the approachs of the various example embodiments are useful for translation of programs from higher level languages into equivalent assembly code, any hardware implementations of translation of programs, software, firmware, and algorithms. Accordingly, the methods and apparatus of the subject matter are applicable to such applications and are in no way limited to the embodiments described herein.

The invention claimed is:

1. A method, comprising:
    modifying source code, including multiple instructions, by performing a Lexical Functional Grammar Analysis (LFGA) operation on one or more instructions as a function of a Digital Signal Processor (DSP) architecture wherein modifying the source code by performing Lexical Functional Grammar Analysis operation further comprises:
    analyzing the modified source code for syntax and semantic; and further modifying the source code based on the outcome of the analysis; and generating assembly code using the modified source code wherein selecting and comparing one or more instructions in the intermediate code using the Genetic algorithm comprises:

selecting an instruction in the intermediate code to generate the efficient code;

computing a current number of clock cycles required to execute the selected instruction;

computing reduction in number of clock cycles by using the current and previous computed number of clock cycles;

comparing the reduction in the number of clock cycles with a predetermined reduction in number of clock cycles;

if the reduction in the number of clock cycles is greater than the predetermined reduction in the number of clock cycles, then selecting a relevant instruction based on specific Digital Signal Processor architecture and applying cross over for the selected instruction and repeating the computing number of clock cycles, the computing reduction in number of clock cycles, and the comparing operations until the reduction in the number of clock cycles is less than or equal to the predetermined reduction in the number of clock cycles;

if the reduction in the number of clock cycles is less than the predetermined reduction in the number of clock cycles, then selecting the instruction for the efficient code and repeating the above operations for a next instruction in the intermediate code; and changing structure of the modified source code through a series of iterations using Finite State Morphology (FSM) to generate efficient source code wherein modifying the structure of the modified source code using Finite State Morphology comprises:

generating intermediate code by rearranging concurrent distributed instructions based on Digital Signal Processor resources using Petri Nets algorithm; and generating the efficient code by selecting and comparing one or more instructions in the intermediate code to one or more other similar available instructions using Genetic algorithm.

2. The method of claim 1, wherein the Digital Signal Processor resources are selected from the group consisting of registers, pipeline structures, instruction scheduling, memory, and MAC units.

3. A method of generating assembly code for execution by a DSP, comprising:

receiving source code in higher level language including multiple instructions; parsing the source code using Lexical Functional Grammar Analysis to modify one or more instructions in the program such that the modified instructions comply with specific Digital Signal Processor resources wherein the specific Digital Signal Processor resources are selected from the group consisting of registers, pipeline structures, instruction scheduling, memory, ALUs, and MAC units;

analyzing the parsed source code for syntax;

updating the parsed source code for syntax based on the analysis;

generating intermediate code by rearranging concurrent distributed instructions based on the specific Digital Signal Processor resources using Petri Nets algorithm; generating first efficient code by selecting and comparing one or more instructions in the intermediate code to one or more other similar instructions, available to process on the specific DSP, using Genetic algorithm wherein selecting and comparing one or more instructions in the intermediate code using the Genetic algorithm comprises:

selecting an instruction in the intermediate code to generate the efficient code;

computing a current number of clock cycles required to execute the selected instruction;

computing reduction in number of clock cycles by using the current and previous computed number of clock cycles;

comparing the reduction in number of clock cycles with a predetermined reduction in number of clock cycles;

if the reduction in the number of clock cycles is greater than the predetermined reduction in the number of clock cycles, then selecting another instruction similar to the selected instruction based on the specific Digital Signal Processor architecture and applying cross over for the selected instruction and repeating the computing number of clock cycles, the computing reduction in number of clock cycles, and the comparing operations until the reduction in the number of clock cycles is less than or equal to the predetermined reduction in the number of clock cycles; and if the reduction in the number of clock cycles is less than the predetermined reduction in the number of clock cycles, then selecting the instruction for the efficient code and repeating the above operations for a next instruction in the intermediate code;

selecting one or more instructions from the multiple instructions that have similar available instruction sets in the first efficient code;

generating second efficient code by performing dynamic instruction replacement on the one or more selected instructions; and generating the assembly code by mapping the second efficient code to assembly language code.

\* \* \* \* \*

UNITED STATES PATENT AND TRADEMARK OFFICE
CERTIFICATE OF CORRECTION

PATENT NO. : 7,437,719 B2  Page 1 of 1
APPLICATION NO. : 10/675910
DATED : October 14, 2008
INVENTOR(S) : Nagaraj et al.

It is certified that error appears in the above-identified patent and that said Letters Patent is hereby corrected as shown below:

On the Title page, in Item (57), under "Abstract", in column 2, line 10, delete "Morpohology" and insert -- Morphology --, therefor.

Signed and Sealed this

Tenth Day of February, 2009

JOHN DOLL
*Acting Director of the United States Patent and Trademark Office*